United States Patent
Hwang et al.

(10) Patent No.: US 9,104,944 B2
(45) Date of Patent: Aug. 11, 2015

(54) OBJECT RECOGNITION METHOD, DESCRIPTOR GENERATING METHOD FOR OBJECT RECOGNITION, AND DESCRIPTOR FOR OBJECT RECOGNITION

(71) Applicant: SAMSUNG ELECTRONICS CO., LTD., Suwon-si (KR)

(72) Inventors: Hyo Seok Hwang, Seoul (KR); Kyung Shik Roh, Seongnam-si (KR); Suk June Yoon, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 166 days.

(21) Appl. No.: 13/729,739

(22) Filed: Dec. 28, 2012

(65) Prior Publication Data

US 2013/0170744 A1 Jul. 4, 2013

(30) Foreign Application Priority Data

Jan. 2, 2012 (KR) .......................... 10-2012-000066

(51) Int. Cl.
*G06K 9/00* (2006.01)
*G06K 9/46* (2006.01)
*G06K 9/66* (2006.01)
*G06K 9/62* (2006.01)

(52) U.S. Cl.
CPC .......... *G06K 9/4652* (2013.01); *G06K 9/00214* (2013.01); *G06K 9/4671* (2013.01); *G06K 9/6211* (2013.01); *G06K 2009/4666* (2013.01)

(58) Field of Classification Search
CPC .......... G06K 9/00201; G06K 9/00523; G06K 9/4652; G06T 2207/10028
USPC .................................................. 382/165, 192
See application file for complete search history.

(56) References Cited

U.S. PATENT DOCUMENTS

| | | | |
|---|---|---|---|
| 7,995,055 B1 * | 8/2011 | Ma et al. ....................... | 345/420 |
| 8,488,877 B1 * | 7/2013 | Owechko et al. .............. | 382/165 |
| 2006/0126939 A1 * | 6/2006 | Park et al. ...................... | 382/190 |
| 2008/0310731 A1 * | 12/2008 | Stojancic et al. ............. | 382/195 |
| 2010/0034422 A1 * | 2/2010 | James et al. ................... | 382/103 |
| 2010/0034426 A1 * | 2/2010 | Takiguchi et al. ............ | 382/106 |
| 2010/0111416 A1 * | 5/2010 | Meiers .......................... | 382/170 |
| 2010/0208035 A1 * | 8/2010 | Pinault et al. .................. | 348/46 |
| 2011/0200261 A1 * | 8/2011 | Lei ................................. | 382/224 |
| 2012/0256916 A1 * | 10/2012 | Kitamura et al. ............. | 345/419 |

OTHER PUBLICATIONS

Gorges et al. ("Haptic Objection Recognition Using Statistical Point Cloud Features," The 15th Int'l Conf. on Advanced Robotics, Jun. 20-23, 2011).*

(Continued)

*Primary Examiner* — Yubin Hung
(74) *Attorney, Agent, or Firm* — Harness, Dickey & Pierce, P.L.C.

(57) ABSTRACT

An object recognition method, a descriptor generating method for object recognition, and a descriptor for object recognition capable of extracting feature points using the position relationship and color information relationship between points in a group that are sampled from an image of an object, and capable of recognizing the object using the feature points, the object recognition method including extracting feature components of a point cloud using the position information and the color information of the points that compose the point cloud of the three-dimensional (3D) image of an object, generating a descriptor configured to recognize the object using the extracted feature components; and performing the object recognition based on the descriptor.

29 Claims, 12 Drawing Sheets

(56) References Cited

OTHER PUBLICATIONS

Rusu et al. ("Fast 3D Recognition and Pose Using the Viewpoint Feature Histogram," IEEE 2010 Int'l Conf. on Intelligent Robots and Systems, Oct. 18-22, 2010).*

Connor et al. ( "Fast Construction of k-Nearest Neighbor Graphs for Point Clouds," IEEE Transactions on Visiualization and Computer Graphics, vol. 16, No. 4, Jul./Aug. 2010, pp. 599-608).*

* cited by examiner (A)

(B)

(C)

(A)

$$\phi_i^j > 0 \; \left(n_i \cdot \left(m_i \times c_i^j\right) < 0\right)$$

(B)

$$\phi_i^j < 0 \; \left(n_i \cdot \left(m_i \times c_i^j\right) > 0\right)$$

OBJECT RECOGNITION METHOD, DESCRIPTOR GENERATING METHOD FOR OBJECT RECOGNITION, AND DESCRIPTOR FOR OBJECT RECOGNITION

CROSS-REFERENCE TO RELATED APPLICATIONS

This application claims the priority benefit of Korean Patent Application No. 10-2012-0000066, filed on Jan. 2, 2012, in the Korean Intellectual Property Office, the disclosure of which is incorporated herein by reference.

BACKGROUND

1. Field

Example embodiments of the following disclosure relate to an object recognition, and more particularly, to an object recognition using an analysis of point clouds of an image.

2. Description of the Related Art

With respect to a method of recognizing an object, various methods are being suggested according to characteristics of sensors that are used during the process of object recognition. Among the various methods, an object recognition method that uses information of an image sensor may be largely grouped into two methods. The first method, for example, scale-invariant feature transform (SIFT) or speeded up robust features (SURF), is achieved by extracting a feature point using the brightness value of each pixel of an image, such that a descriptor is generated. The second method is achieved by an edge of an object using the differential of the brightness of an image, such that the shape of an object is inferred and recognized using the edge. The method as such is achieved by acquiring a three-dimensional (3D) point cloud using TOF (Time of Flight) and a laser sensor, in addition to an image sensor to recognize an object based on the acquired 3D point clouds.

Regarding related methods, depending on the characteristic of the algorithm of each method, each method is provided with difficulties. As for the method, such as SIFT and SURF, of recognizing an object by the brightness value, a pattern that is not repeated on the surface of the object is needed to be provided. That is, distinguishing dishes and balls that are used in real life may be difficult. In addition, in a case when an object is largely inclined in an image, the recognition rate is rapidly decreased. The method of extracting the edge of an object, on the contrary, provides a lower object recognition rate as the external shape of the object becomes simpler. In addition, in a case when many lines are extracted due to the complexity of the background of an object, the time of performing the object recognition is rapidly increased. The algorithm using 3D point clouds as well is configured to have only the shape of an object as the characteristic of the object, and thus, the method may not be able to distinguish the objects having similar shapes to each other.

Therefore, there is a need for improved object recognition.

SUMMARY

Therefore, it is an aspect of the present disclosure to provide an object recognition capable of extracting feature points by using the position relationship and the color information relationship between points in a group of points that are sampled from an image of an object, and recognizing the object by using the feature points.

Additional aspects of the disclosure will be set forth in part in the description which follows and, in part, will be obvious from the description, or may be learned by practice of the disclosure.

In accordance with the present disclosure, a method of recognizing an object is as follows. A feature component of a point cloud may be extracted by using position information and color information of points that form the point cloud of a three-dimensional image of the object. A descriptor configured to recognize the object may be generated by using the extracted feature component. The object may be recognized based on the descriptor.

The feature component may include a first feature component, a second feature component, a third feature component, and a fourth feature component. The first feature component may be a difference of brightness values between a reference point and a neighborhood point of the point cloud. The second feature component may be a hue value of the neighborhood point. The third feature component may be an angle between a vector that connects from the reference point to the neighborhood point and a vector that connects from the reference point to a projection point of the neighbor point. The fourth feature component may be an angle between a dominant vector of the point cloud and the vector that connects from the reference point to the projection point of the neighbor point.

The first feature component may be expressed as a following mathematical formula:

$$di_i^j = v_i - v_j,$$

herein $v_i$ and $v_j$ may be a brightness value of the reference point and a brightness value of the neighborhood point, respectively.

The second feature component may be expressed as a following mathematical formula:

$$ah_i^j = h_j,$$

herein $h_j$ may be a hue value of the neighbor point.

The third feature component may be expressed as a following mathematical formula:

$$\theta_i^j = \arctan\left(\frac{a_i^j}{c_i^j}\right),$$

herein $a_i^j$ may be equal to $$\frac{v_i \cdot b_i}{\|v_i\|^2} \times v_i,$$

$c_i^j$ may be equal to $b_i^j - a_i^j$, $b_i^j$ may be equal to $p_j - p_i$, pi and pj may represent a position coordinate of the reference point and a position coordinate of the neighbor point, respectively.

The fourth feature component may be expressed as a following mathematical formula:

$$\phi_i^j = \arccos\left(\frac{m_i \cdot c_i^j}{\|m_i\|\|c_i^j\|}\right),$$

herein $m_i$ may be equal to $$\sum_{j=1}^{k} m_i^j,$$

and $m_i^j$ may be equal to $$\frac{c_i^j}{\|c_i^j\|}\left(dt_i^j \times \frac{1}{\sqrt{e^{\|c_i^j\|}}}\right).$$

A sign of the fourth feature component may be determined according to a following condition:

$$\phi_i^j = \begin{cases} -\phi_i^j, & \text{if } v_i \cdot (m_i \times c_i^j) \geq 0 \\ \phi_i^j, & \text{otherwise} \end{cases}.$$

The descriptor may be generated using a process of stacking from the first to the fourth feature components at a histogram.

Each of the first to fourth feature components may have a value corresponding to one of a plurality of sections divided between a maximum value and a minimum value that are available for the each of the first to fourth feature components.

The points of the point cloud may be divided into a plurality of groups based on a distance from the reference point, and a descriptor having a predetermined number of sections for each of the plurality of groups may be generated.

The method may be achieved by further performing a sampling to select K-nearest neighbor points with respect to a single reference point of the point cloud of the three dimensional image of the object, wherein K is a random integer.

In accordance with another aspect of the present disclosure, a method of generating a descriptor for an object recognition is as follows. A first feature component, which is a difference of brightness values between a reference point and a neighbor point may be obtained. A second feature component, which is a hue value of the neighbor point may be obtained. A third feature component, which is an angle between a vector that connects from the reference point to the neighbor point and a vector that connects from the reference point to a projection point of the neighbor point, may be obtained with respect to a point cloud of a three dimensional image of an object. A fourth feature component, which is an angle between a dominant vector of the point cloud and a vector that connects from the reference point to the projection point of the neighbor point may be obtained. A descriptor configured for the object recognition may be generated by using the first to the fourth feature components.

The first feature component may be expressed as a following mathematical formula:

$$di_i^j = v_i - v_j,$$

herein vi and vj may be a brightness value of the reference point and a brightness value of the neighbor point, respectively.

The second feature component may be expressed as a following mathematical formula:

$$ah_i^j = h_j,$$

herein hj may be a hue value of the neighbor point.

The third feature component may be expressed as a following mathematical formula:

$$\theta_i^j = \arctan\left(\frac{a_i^j}{c_i^j}\right),$$

herein $a_i^j$ may be equal to $$\frac{v_i \cdot b_i}{\|v_i\|^2} \times v_i,$$

$c_i^j$ may be equal to $b_i^j - a_i^j$, $b_i^j$ may be equal to $p_j - p_i$, pi and pj may represent a position coordinate of the reference point and a position coordinate of the neighbor point, respectively.

The fourth feature component may be expressed as a following mathematical formula:

$$\phi_i^j = \arccos\left(\frac{m_i \cdot c_i^j}{\|m_i\|\|c_i^j\|}\right),$$

herein $m_i$ may be equal to $$\sum_{j=1}^{k} m_i^j,$$

$m_i^j$ may be equal to $$\frac{c_i^j}{\|c_i^j\|}\left(dt_i^j \times \frac{1}{\sqrt{e^{\|c_i^j\|}}}\right).$$

A sign of the fourth feature component may be determined according to a following condition:

$$\phi_i^j = \begin{cases} -\phi_i^j, & \text{if } v_i \cdot (m_i \times c_i^j) \geq 0 \\ \phi_i^j, & \text{otherwise} \end{cases}.$$

The first to fourth feature components may be extracted from a K-nearest neighbor point group with respect to the reference point, wherein K may be a random integer.

The descriptor may be generated using a process of stacking from the first to the fourth feature components at a histogram.

Each of the first to fourth feature components may have a value corresponding to one of a plurality of sections divided between a maximum value and a minimum value that are available for the each of the first to fourth feature components.

The points of the point cloud may be divided into a plurality of groups based on a distance from the reference point, and a descriptor having a predetermined number of sections for each of the plurality of groups may be generated.

The method may be achieved by further performing a sampling to select K-nearest neighbor points with respect to a single reference point of the point cloud of the three dimensional image of the object, wherein K is a random integer.

In accordance with another aspect of the present disclosure, a descriptor for an object recognition includes a first feature component, a second feature component, a third feature component and a fourth feature component. The first feature component may be a difference of brightness values between a reference point and a neighbor point of a point cloud of a three dimensional image of an object. The second feature component may be a hue value of the neighbor point. The third feature component may be an angle between a vector that connects from the reference point to the neighbor point and a vector that connects from the reference point to a projection point of the neighbor point. The fourth feature component may be an angle between a dominant vector of the point cloud and the vector that connects from the reference point to the projection point of the neighbor point.

The first feature component may be expressed as a following mathematical formula:

$$di_i^j = v_i - v_j,$$

herein vi and vj may be a brightness value of the reference point and a brightness value of the neighbor point, respectively.

The second feature component may be expressed as a following mathematical formula:

$$ah_i^j = h_j,$$

herein hj may be a hue value of the neighbor point.

The third feature component may be expressed as a following mathematical formula:

$$\theta_i^j = \arctan\left(\frac{a_i^j}{c_i^j}\right),$$

herein $a_i^j$ may be equal to $$\frac{v_i \cdot b_i}{\|v_i\|^2} \times v_i,$$

$c_i^j$ may be equal to $b_i^j - a_i^j$, $b_i^j$ may be equal to $p_j - p_i$, pi and pj may represent a position coordinate of the reference point and a position coordinate of the neighbor point, respectively.

The fourth feature component may be expressed as a following mathematical formula:

$$\phi_i^j = \arccos\left(\frac{m_i \cdot c_i^j}{\|m_i\|\|c_i^j\|}\right),$$

herein $m_i$ may be equal to $$\sum_{j=1}^{k} m_i^j,$$

$m_i^j$ may be equal to $$\frac{c_i^j}{\|c_i^j\|}\left(di_i^j \times \frac{1}{\sqrt{e^{\|c_i^j\|}}}\right).$$

A sign of the fourth feature component may be determined according to a following condition:

$$\phi_i^j = \begin{cases} -\phi_i^j, & \text{if } v_i \cdot (m_i \times c_i^j) \geq 0 \\ \phi_i^j, & \text{otherwise} \end{cases}.$$

As described above, feature points are extracted by using the position relationship and color information relationship between points in a group of points are sampled from an image of an object, and the object is recognized by using the feature points, so that the recognition rate with respect to the objects having similar shapes or similar patterns may be largely enhanced.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference labels refer to like components throughout.

Figure 1:
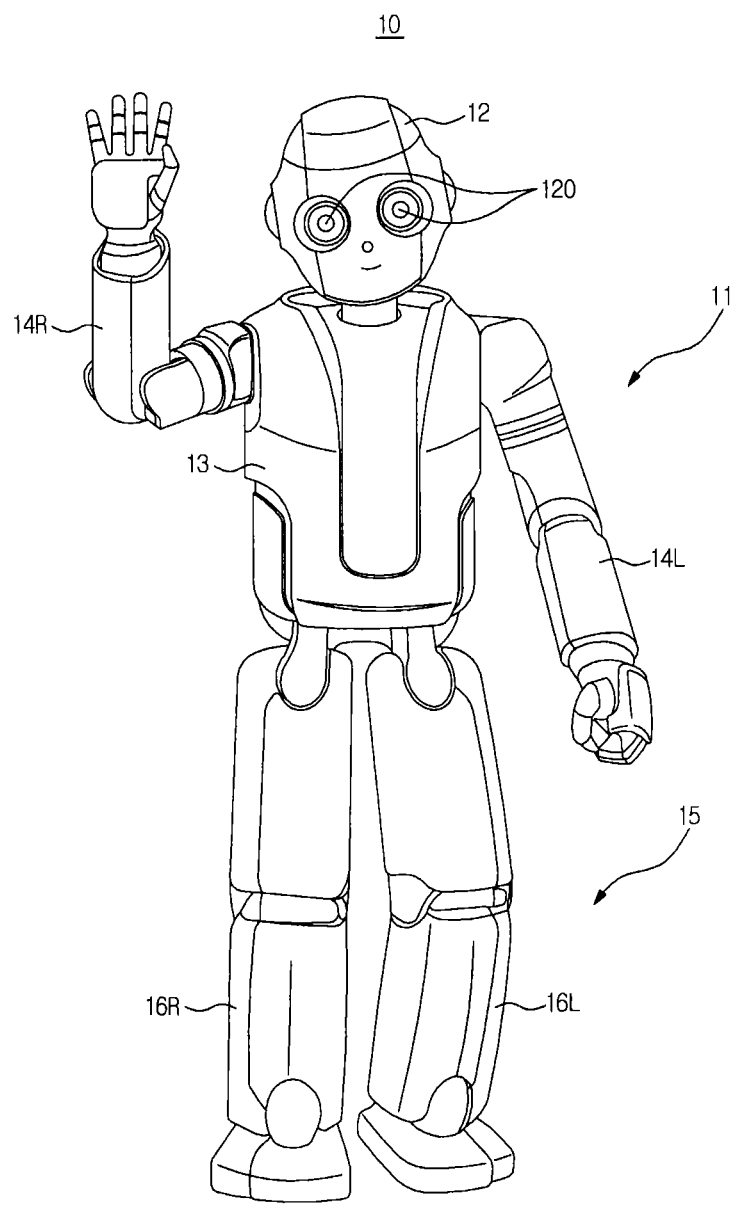
FIG. 1 illustrates an exterior appearance of a walking robot as an example of a mobile apparatus in accordance with an example embodiment of the present disclosure.

FIG. 1 illustrates an exterior appearance of a walking robot as an example of a mobile apparatus in accordance with an example embodiment of the present disclosure. That is, the mobile apparatus of the present disclosure is not limited to a walking robot.

As illustrated on FIG. 1, a walking robot 10, which is an example of a mobile apparatus in accordance with an example embodiment of the present disclosure, as similar to a human being, may be a biped robot configured to walk in an erect manner by two legs 16L and 16R, and is provided with an upper body 11 having a head 12, a torso 13, and two arms 14L and 14R, and with a lower body 15 having the two legs 16L and 16R. At the mechanical part of the head 12 having the shape of the eyes of a human being, an image sensor 120 configured to photograph the surroundings of a moving space may be installed.

With respect to the reference labels, the letters "R" and "L" that follow after the numbers represent the left side and the right side of the walking robot 10, respectively.

In an example embodiment, as a mobile apparatus, a walking biped robot is described as an example. However, other than the above, the present disclosure may be adapted to various types of mobile robots, including but not limited to, a cleaning robot at a household, a service robot for a public space, a carrier robot at a production site, and an auxiliary robot for a laborer, as well as to mobile apparatus, although not provided with an autonomous mobile function, that may be carried and manipulated by a human being, such as, a mobile communication apparatus, such as, a mobile phone.

Figure 2:
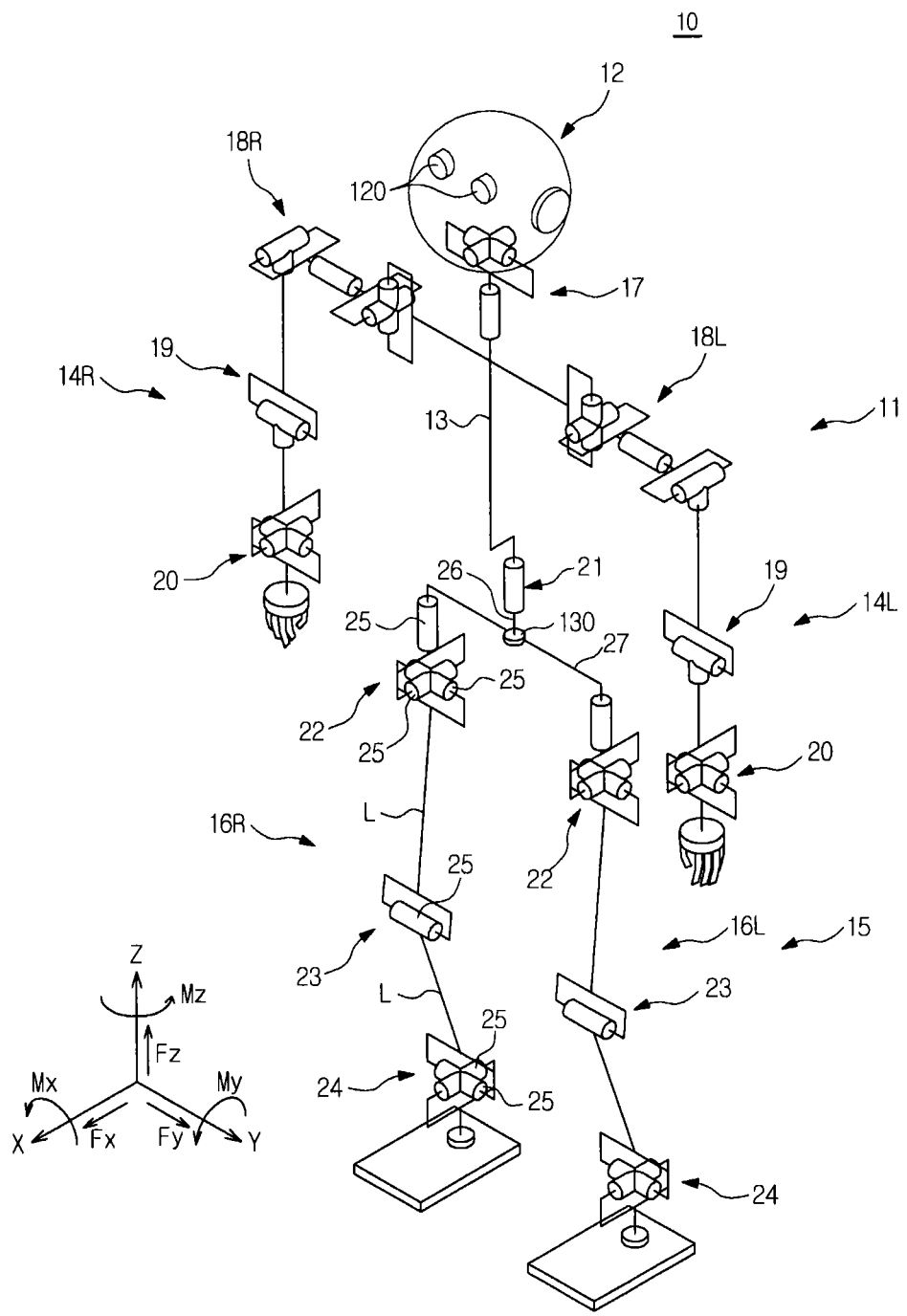
FIG. 2 illustrates main mechanism and joint structures of the walking robot illustrated in FIG. 1.

FIG. 2 illustrates main mechanism and joint structures of the walking robot illustrated on FIG. 1.

As illustrated on FIG. 2, at the head 12 of the walking robot 10, the image sensors 120 configured to photograph the surroundings of a moving space may be installed.

The head 12 is connected to the torso 13 of the upper body 11 through a neck joint unit 17. At the torso 13, the two arms 14L and 14R, and the two legs 16L and 16R, a plurality of joint units including shoulder joint units 18L and 18R, elbow joint units 19, wrist joint units 20, a waist joint unit 21, a hip joint unit 22, knee joint units 23, ankle joint units 24 may be installed. Each joint unit 18L, 18R, 19, 20, 21, 22, 23, and 24, depending on the degree of freedom, that is, the number of directions toward which a joint moves, includes one to three units of rotation joint 25. For example, the hip joint unit 22 is provided with three degrees of freedom by having the rotation joint 25 in a yaw direction, that is, a rotation on a z-axis, the rotation joint 25 in a pitch direction, that is, a rotation on a y-axis, and the rotation joint 25 in a roll direction, that is, a rotation on an x-axis. Each joint unit 18L, 18R, 19, 20, 21, 22, 23, and 24 is connected by a link 'L', that is, a structure illustrated as a straight line on FIG. 2.

At the waist joint unit 21 installed at a lower side of the upper body 11, a pelvis 26 configured to support the upper body 11 may be connected. The pelvis 26 is connected to the hip joint unit 22 through a pelvis link 27. At the pelvis link 27, an Inertial Measurement Unit (IMU) sensor 130 configured to detect the posture information (the angle information) of the walking robot 10 may be installed. The IMU sensor 130, by detecting the relative angles of the pelvis link 27 with respect to the gravity direction and an inertial system, generates the posture information (the angle information) of the roll direction, the pitch direction, and the yaw direction. The IMU sensor 130 may be installed at other areas of the walking robot 10, including the torso 13 and the head 12, and is not limited to the pelvis link 27.

Figure 3:
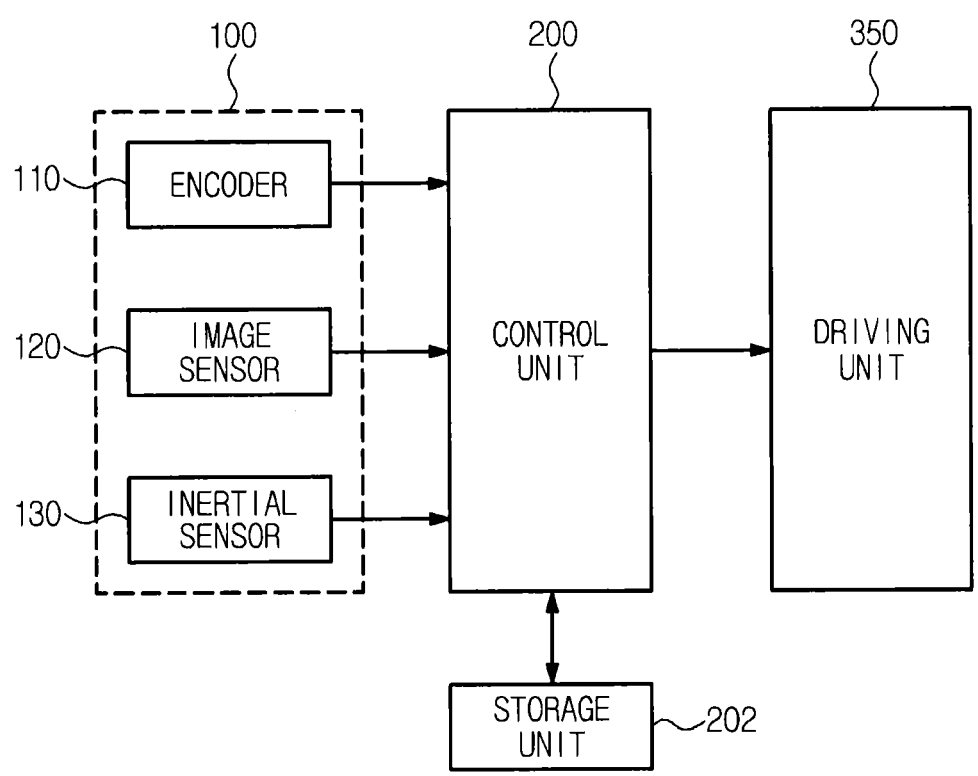
FIG. 3 illustrates a control system of the walking robot illustrated in FIG. 1, according to example embodiments.

Although not illustrated on FIG. 2, each of the joint units 18, 19, 20, 21, 22, 23, and 24 of the walking robot 10 may be provided with an actuator, such as a motor that corresponds to a driving unit of FIG. 3 to drive the each rotation joint 25 by a driving force, such as, electricity or oil pressure, and an encoder (110 on FIG. 3) to detect the rotation angle of the each actuator, that is, the rotation angle of the each rotation joint 25. A control unit (200 on FIG. 3) by controlling the actuators as such, various motions of the walking robot 10 may be implemented.

FIG. 3 illustrates a control system of the walking robot 10 illustrated in FIG. 1.

As illustrated on FIG. 3, the control system of the walking robot 10, which is an example of a mobile apparatus, in accordance with an example embodiment of the present disclosure includes a sensor module 100, the control unit 200, a storage unit 202, and a driving unit 350. Each of the described units may include at least one processing device.

The sensor module 100 may include a plurality of sensors 110, 120, and 130 configured to detect the information with respect to the walking robot 10 and the information with respect to a moving space. That is, the sensor module 100 may include various sensors, such as, the encoder 110 configured to acquire the rotation angle information of the rotation angle that is related to the walking of the walking robot 10, the image sensor 120 configured to photograph the surroundings of a moving space at which the walking robot 10 is performing a walk, and the inertial sensor 130 configured to detect the posture information or the angle information of the walking robot 10.

At the sensor module 100, the encoder 110 may detect the rotation angle of the actuator (driving unit) that is installed to rotatively drive each rotation joint 25 provided at the each hip joint unit 22, the knee joint units 23, and the ankle joint units 24, for example.

At the sensor module 100, the image sensor 120 may detect the light being reflected from a subject, and by converting the light into the digital signal, acquires the image information of the surroundings of a moving space. As for the image sensor 120, a CCD (Charge-Coupled Device) camera, a CMOS (Complementary Metal Oxide) camera, and a TOF (Timer of Flight) camera may be used, and other than the above, any apparatus, which is capable of acquiring the image information and the three-dimensional information with respect to the object positioned on the path at which the walking robot 10 performs a walking, may be used.

At the sensor module 100, the inertial sensor 130 is configured to measure various information related to a navigational method of the walking robot 10, such as the acceleration, the speed, and the direction (the angle) of the walking robot 10, and measures the degree of inclination and the rotation direction of the roll direction, the pitch direction, and the yaw direction of the pelvis link 27. The inertial sensor 130 includes an inclination sensor to measure the angle of the walking robot 10, and the angular velocity sensor to measure the angular velocity of the walking robot 10. Here, for example, as the inclination sensor, an accelerometer may be used, and as the angular velocity sensor, a rate-gyroscope may be used.

The control unit 200 may control the overall motion of the walking robot 10, using information collected by each of the plurality of sensors, such as, the encoder 110, the image sensor 120, and the inertial sensor 130.

The storage unit 202 is configured to store the information needed for the walking robot 10 to perform a motion. Further, at the storage unit 202, mechanical information of the link, that is, the mechanical structure that connects in between joint units; a position recognition result, that is, the position information of a sign, the position information and the posture information of the walking robot of the walking robot 10 that is calculated by using a plurality of algorithms, that is, a plurality of filters; and a local map with respect to a moving space, that is, a working space, that is drawn by using the plurality of algorithms, particularly, a SLAM algorithm, are stored.

The example embodiment of the present disclosure is described in relation to a structure having the storage unit 202, which is configured to store the prior information and the performance result of the position recognition that are needed for the walking robot 10 to perform a motion, separately provided as an example. However, the advance information for position recognition may be stored in an internal memory at an inside the control unit 200 without employing the structure of the storage unit 202.

The driving unit 350 is referred to as the actuator, such as, a motor, configured to deliver driving force generated by electricity or oil pressure to each rotation joint 25 that composes each joint unit 18L, 18R, 19, 20, 21, 22, 23, and 24, and rotatively drives each rotation joint 25 of the each joint unit 18, 19, 20, 21, 22, 23, and 24 according to the control signal being delivered from the control unit 200.

In order for the walking robot 10 to freely walk in a given moving space, the walking robot 10 is needed to recognize and avoid an obstacle or a wall that is present in the moving space. For the above, a three-dimensional position recognition ability of the walking robot 10 is needed to be superior. As a representative three-dimensional object recognition method, a method using a three-dimensional point cloud is included other than an object recognition method using a color image. The object recognition method using a three-dimensional point cloud is performed by comparing the geometric position relationship between the point cloud of a particular object and the input point cloud on a database.

Figure 4:
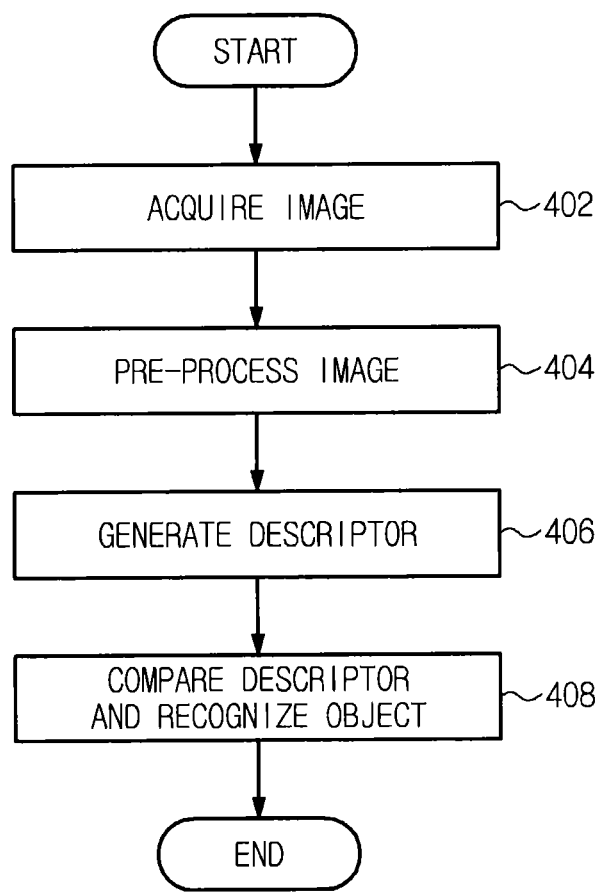
FIG. 4 is a flowchart showing an object recognition method in accordance with an example embodiment of the present disclosure.

FIG. 4 is a flowchart showing an object recognition method in accordance with an example embodiment of the present disclosure. As shown on FIG. 4, first, the walking robot 10 acquires the image of a given moving space in operation 402. The walking robot 10 recognizes an object through an analysis of the image. As the image is acquired, a pre-processing process of the image is performed in operation 404. At the pre-processing process, through the analysis of the image information, various information needed to generate a descriptor in the next process is obtained. As the pre-processing process is completed, by using the result from the pre-processing process, the descriptor is generated in operation 406. The descriptor is configured to find an authentic characteristic of the object, which is needed to recognize the object, and describe the authentic characteristic of the object. After the descriptor is generated, by comparing the descriptor, the object may be recognized in operation 408.

Figure 5:
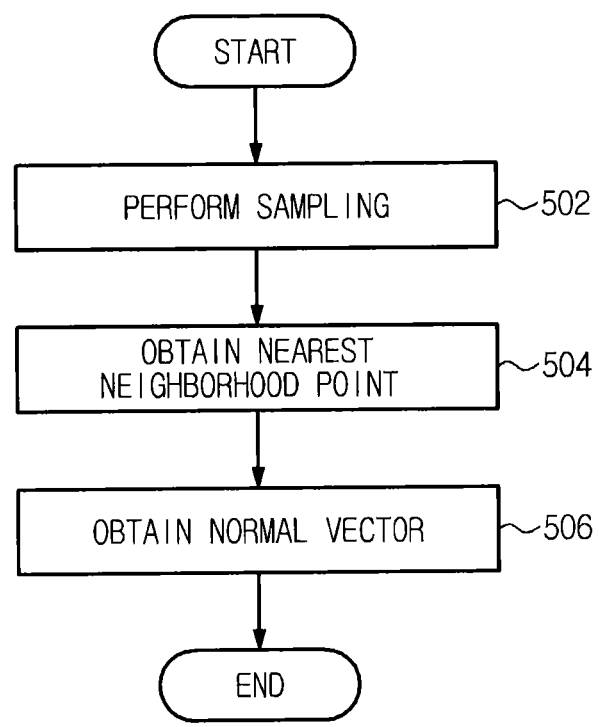
FIG. 5 and FIG. 6 are drawings showing the detailed method of a pre-processing process shown in FIG. 4.
Figure 6:
Figure 6:
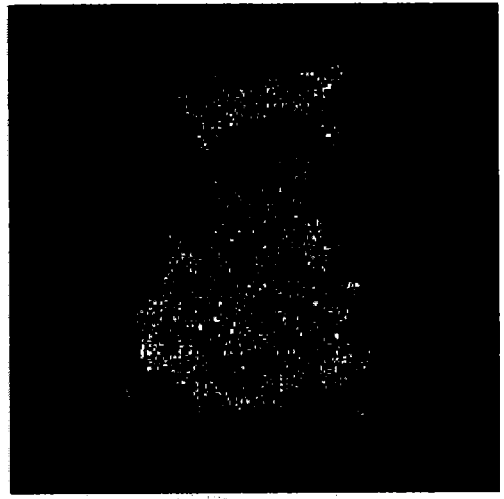
Figure 6:
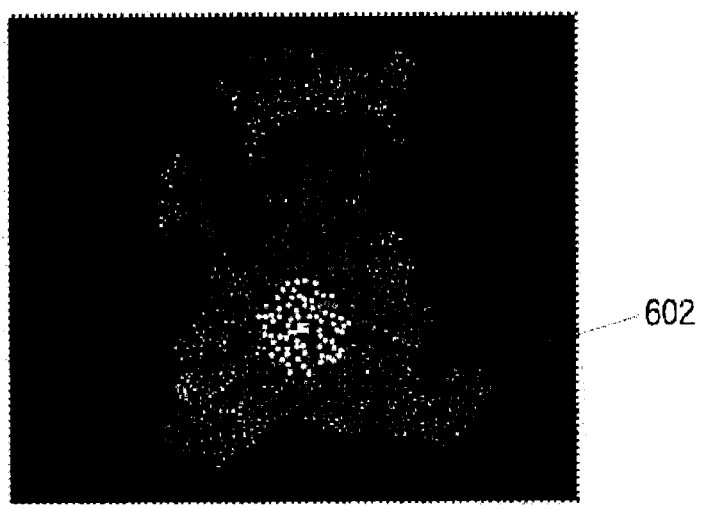

FIG. 5 and FIG. 6 are drawings showing the detailed method of a pre-processing process shown on FIG. 4. First, as shown on FIG. 5, the pre-processing process of the image includes a sampling in operation 502, obtaining the nearest neighborhood in operation 504, and obtaining a normal vector in operation 506.

For the 3D object recognition in accordance with an example embodiment of the present disclosure, first, a point cloud group of an image is needed to be obtained, and the more the number of the point clouds, the longer is the operation time for the object recognition.

In the generating of the descriptor, the descriptors may be generated with respect to all the points in the point cloud, but as for the recognition performance, when compared to the case of generating the descriptor through the sampling process, the difference is not large. Thus, as long as the recognition performance is not being largely harmed, as to reduce the overall operation time, the sampling is performed with respect to the point cloud in operation 502.

In an example embodiment of the present disclosure, as the sampling method, an equal interval gap extraction method is suggested. The equal interval extraction method is configured to take only the points, which are spaced apart from each other by the same interval among all the points forming the point cloud. That is, a 'T' group, that is, a traversed group, having the same size as the number of the points of the point cloud is initialized, and by searching for the points in sequence from the beginning, points within a certain distance 'N' from a particular point are found, and then 'T' value is assigned with 'True'. If the 'T' value of the point being searched next is 'True', the point is skipped since the point is included in the certain distance 'N' with respect to one point, and when the point provided with the 'T' value that is 'False' is found, the 'T' value of the point that is within a certain distance 'N' from the point provided with the 'T' value being assigned with 'False' is assigned with 'True'. Through the process as such, the point cloud includes the points having the distance of 'N', thereby resulting in the reduction of the number of the points through the sampling.

FIG. 6 is the drawing showing the point cloud before/after the sampling is taken place. The (A) of FIG. 6 is an image of the point cloud prior to the sampling, and the (B) of FIG. 6 is an image of the point clouds after the equal interval sampling. Through the sampling, the number of the points is largely reduced, but it is acknowledged that the shape of the object is maintained at the level at which the object is still recognizable.

Referring again to FIG. 5, after the sampling is completed, the nearest neighborhood is obtained in operation 504. The nearest neighborhood is referred to obtaining a group of points that are provided with the nearest Euclidian distance with respect to one point.

Depending on the embodiments, a K-nearest neighborhood method is used. The (C) of FIG. 6 is an image of the K-nearest neighborhood group, that is, the bright-colored points at the surroundings of one point 602.

Referring again FIG. 5, when the obtaining of the nearest neighborhood is completed, the normal vector is obtained in operation 506. That is, with respect to all the points of the point cloud, by using the nearest neighborhood points, the normal vector 'V' is obtained. The normal vector is normalized to have the size of 1.

When the pre-processing of the image is completed, the descriptor generating process is initiated. In order to generate the descriptor, the feature component of each point cloud is extracted, and by using the extracted feature component, the descriptor is generated. Through FIGS. 7 to 9, a method of extracting the feature component is described, and through FIG. 10 to FIG. 12, a method of generating the descriptor will be described.

Figure 7:
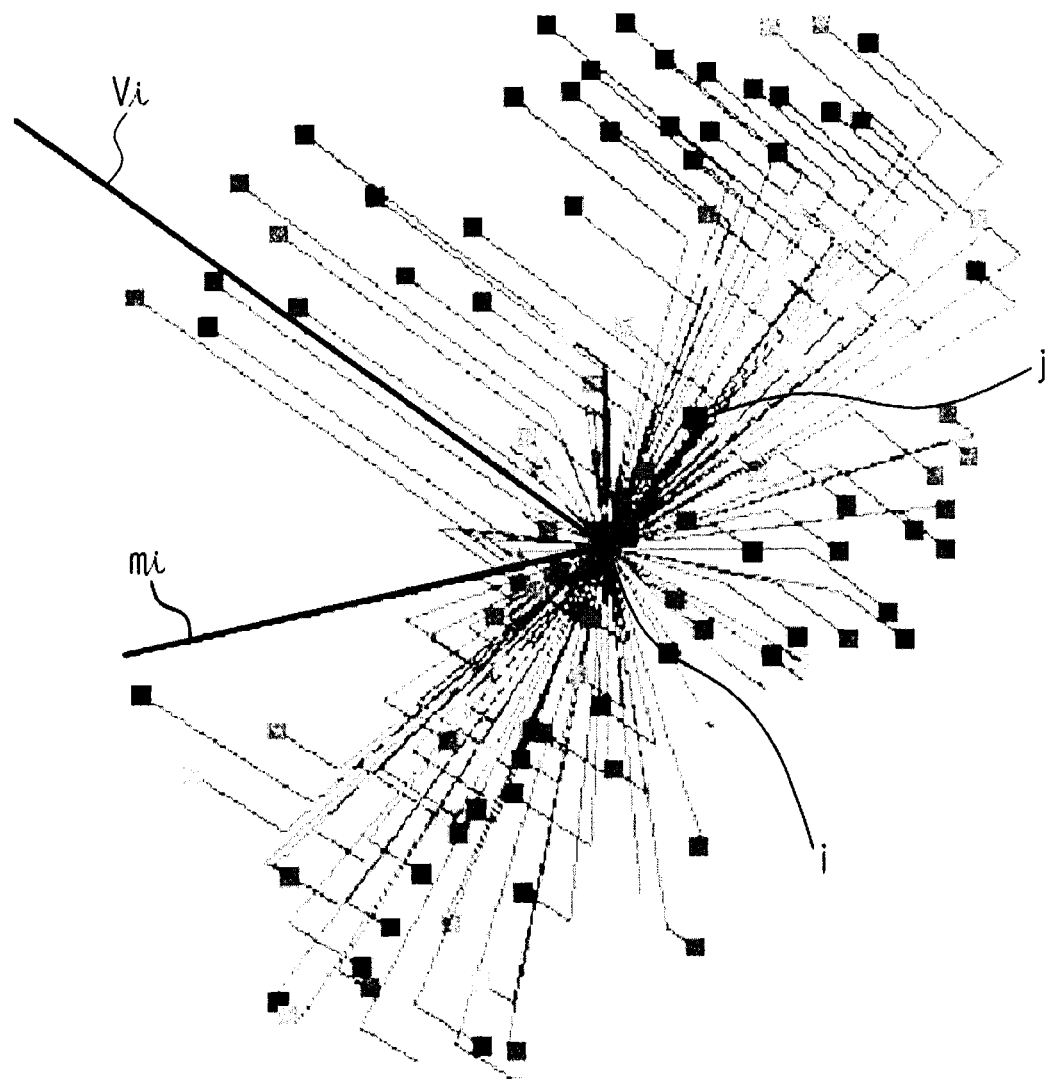
FIG. 7 illustrates feature components of a point cloud, according to example embodiments.

FIG. 7 is a drawing showing feature components of a point cloud. In FIG. 7, the one assigned with the reference label 'Vi' is referred to the normal vector of a certain one point (hereafter called as the reference point 'i') of the point cloud, and the one assigned with the reference label 'mi' is referred to a dominant vector of the reference point 'i'. Here, the dominant vector 'mi' is determined as a direction toward which the direction of the brightness value in between the reference point 'i' and a neighborhood point, for example, 'j', is rapidly changed to the largest degree. In FIG. 7, the lines that connect the remaining points indicate that the each point is vertically projected at the surface that is in perpendicular to the normal vector 'Vi' at the reference point 'i'.

The difference 'di', which is shown on FIG. 7, between the brightness value of the reference point 'i' and the brightness value of the neighborhood point 'j' of the point cloud group is the first feature component, and may be shown with the difference of the brightness 'V' value at the HSV color space, that is, the hue space, the saturation space, and the value space, and the such may be expressed as the mathematical formula 1, shown below. In the HSV color space, the brightness is labeled with 'V'.

$$di_i^j = v_i - v_j$$ [Mathematical Formula 1]

In the mathematical formula 1, the 'vi' and the 'vj' are the brightness 'V' values of the reference point 'i' and the neighborhood point 'j', respectively, at the HSV color space.

In addition, the 'ah' value, that is, the absolute hue value, of the reference point 'i' and the neighborhood point 'j' is the second feature component, and is determined by the hue value of the neighborhood point 'j', shown as the following mathematical formula 2.

$$ah_i^j = h_j$$

Figure 8:
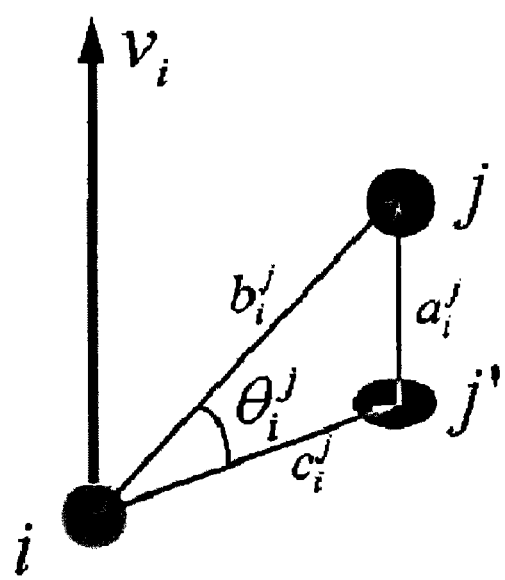
FIG. 8 illustrates a projected neighborhood point, that is, a projection point j', being formed on a plane when a neighborhood point j is projected on the plane that is vertical to a normal vector Vi, according to example embodiments.

FIG. 8 is a drawing showing a projected neighbor point, that is, a projection point j', being formed on a plane when a neighbor point j is projected on the plane that is vertical to a normal vector Vi. By using the relationships among the reference point 'i', the neighborhood point 'j', and the projection point 'j'' shown on FIG. 8, the feature components including 'a', 'b', 'c', 'θ', and 'Ø' may be obtained.

First, the feature component 'b' may be expressed as the following mathematical formula 3.

$$b_i^j = p_j - p_i$$ [Mathematical Formula 3]

In the mathematical formula 3, the 'pi' and the 'pj' are the position coordinates of the reference point 'i' and the neighborhood point 'j', respectively.

The feature component 'a' may be expressed as the following mathematical formula 4.

$$a_i^j = \frac{(v_i \cdot b_i)}{\|v_i\|^2} \times v_i$$ [Mathematical Formula 4]

The feature component 'c' may be expressed as the following mathematical formula 5.

$$c_i^j = b_i^j - a_i^j$$ [Mathematical Formula 5]

After obtaining the values of the above feature components with respect to all the neighborhood points 'j' of the reference point 'i', the dominant vector 'mi' of the reference point is obtained. The dominant vector 'mi' is used when obtaining the 'Ø' among the feature components.

Another feature component 'θ' is the third feature component, and as shown on FIG. 8, the 'θ' may be expressed as the following mathematical formula 6. Here, 'b' is the vector that connects from the reference point 'i' to the neighborhood point 'j', and the 'c' is the vector that connects the reference point 'i' to the projection point 'j''.

$$\theta_i^j = \arctan\left(\frac{a_i^j}{c_i^j}\right)$$ [Mathematical Formula 6]

Figure 9:
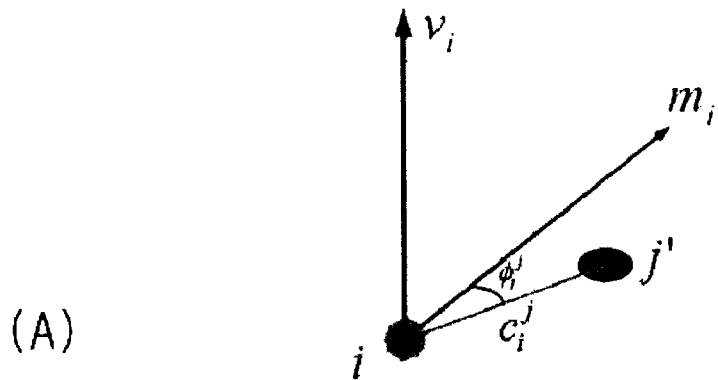
FIG. 9 illustrates a relationship between a main vector mi and a feature component 'Ø', according to example embodiments.
Figure 9:
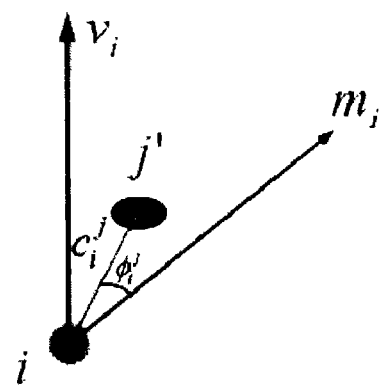

FIG. 9 is a drawing showing a relationship between a main vector mi and a feature component φ. The (A) of FIG. 9 is referred to the case when Ø>0, and the (B) of FIG. 9 is referred to the case when Ø<0. The Ø is the fourth feature component, and shows the angle of the projection point 'j'' of the neighborhood point 'j' with respect to the dominant vector 'mi' of the point cloud.

The dominant vector with respect to a particular neighborhood point 'j' of the reference point 'i' may be expressed as the following mathematical formula 7 and the mathematical formula 8.

$$m_i^j = \frac{c_i^j}{\|c_i^j\|}\left(dt_i^j \times \frac{1}{\sqrt{e^{\|c_i^j\|}}}\right)$$ [Mathematical Formula 7]

$$m_i = \sum_{j=1}^{k} m_i^j$$ [Mathematical Formula 8]

By using the dominant vector 'mi', the 'Ø' may be able to be obtained by using the following mathematical formula 9.

$$\phi_i^j = \arccos\left(\frac{m_i \cdot c_i^j}{\|m_i\|\|c_i^j\|}\right)$$ [Mathematical Formula 9]

The sign of the 'Ø' may be determined as follows.

$$\phi_i^j = \begin{cases} -\phi_i^j, & \text{if } v_i \cdot (m_i \times c_i^j) \geq 0 \\ \phi_i^j, & \text{otherwise} \end{cases}$$ [Mathematical Formula 10]

Since the range of an arc cosine is from about 0° to 180°, in order to decide the sign of the 'Ø', the outer product of the domain vector 'mi' and the projection vector 'c', that is, the vector that connects the reference point 'i' to the projection point 'j'', and the inner product of the outer product above and the normal vector 'Vi' are determined. If the resulting value of the inner product of the above is equal to or larger than 0, the sign of the 'Ø' becomes negative (−), and if the resulting value of the inner product of the above is smaller than 0, the sign of the 'Ø' becomes positive (+).

Through the process above, the feature components i 'di', 'ah', and 'θ', and the 'Ø' of the corresponding point cloud, with respect to all of the 'K' number of the neighborhood points 'j' of the each reference point 'i' of the point cloud are obtained. By using the total of the 4 feature components, the descriptor is generated.

Figure 10:
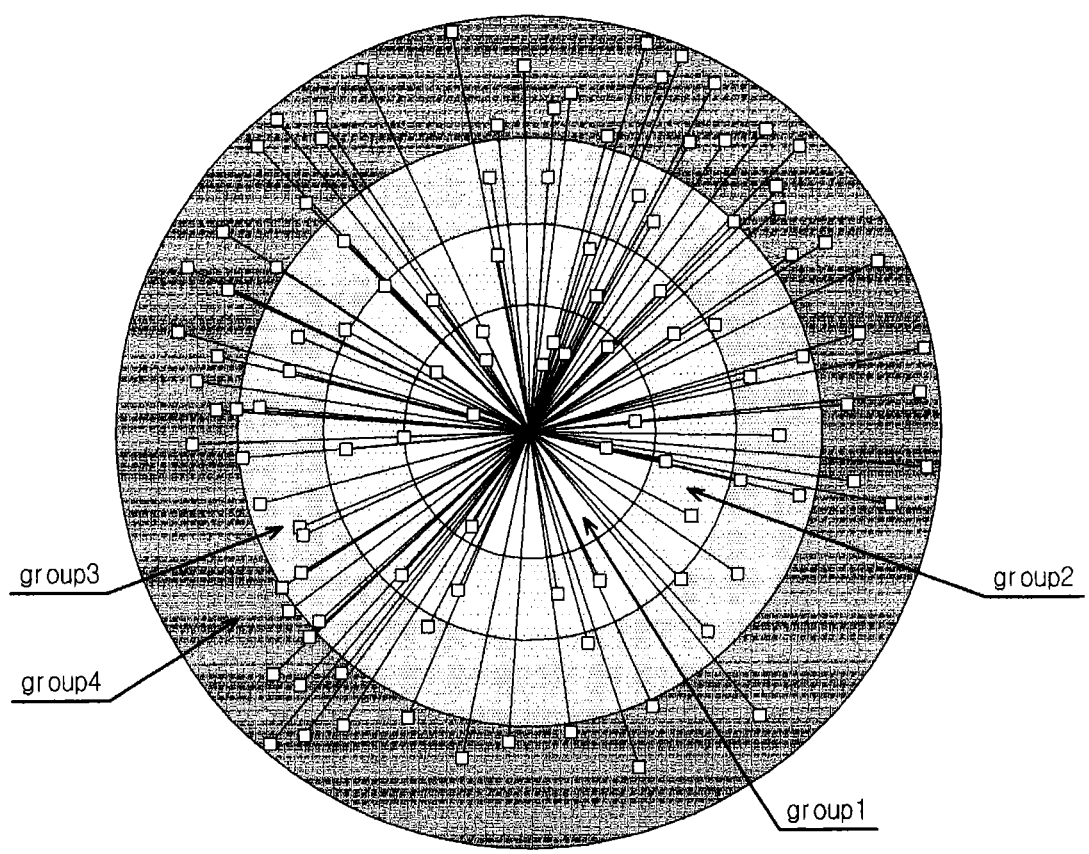
FIG. 10 illustrates an example of grouping K number of neighbor points j of a reference point i, according to example embodiments.

FIG. 10 is a drawing showing an example of grouping K number of neighbor points j of a reference point i. As shown on FIG. 10, the 'K' number of the neighborhood points 'j' of the reference point 'i' is divided into 4 groups based on the distance from the reference point 'i'.

As can be seen from FIG. 10, group 1 refers to the inner most region, group 2 refers to the next region, group 3 refers to the next region, and lastly, group 4 refers to the outside region. Although FIG. 10 shows 4 groups, i.e., group 1, group 2, group 3, and group 4, these are exemplary, and thus, the present disclosure is not limited thereto.

The descriptor is generated through a method of stacking each feature component at the histogram. The one feature component is provided with the total of the 8 sections. That is, the one feature component belongs to a certain one section. That is, the one feature component is provided with the value of one section of the total of the 8 sections that are derived by dividing the difference of the maximum value and the minimum value that the feature component may be provided with. In the embodiment of the present disclosure, the total of the 4 feature components including the 'di', the 'ah', the 'θ', and the 'Ø' are being used, and thus the feature component of the reference point 'i' and a certain one neighborhood point 'j' belongs to the histogram provided with the total of the 32 (8×4) sections.

Figure 11:
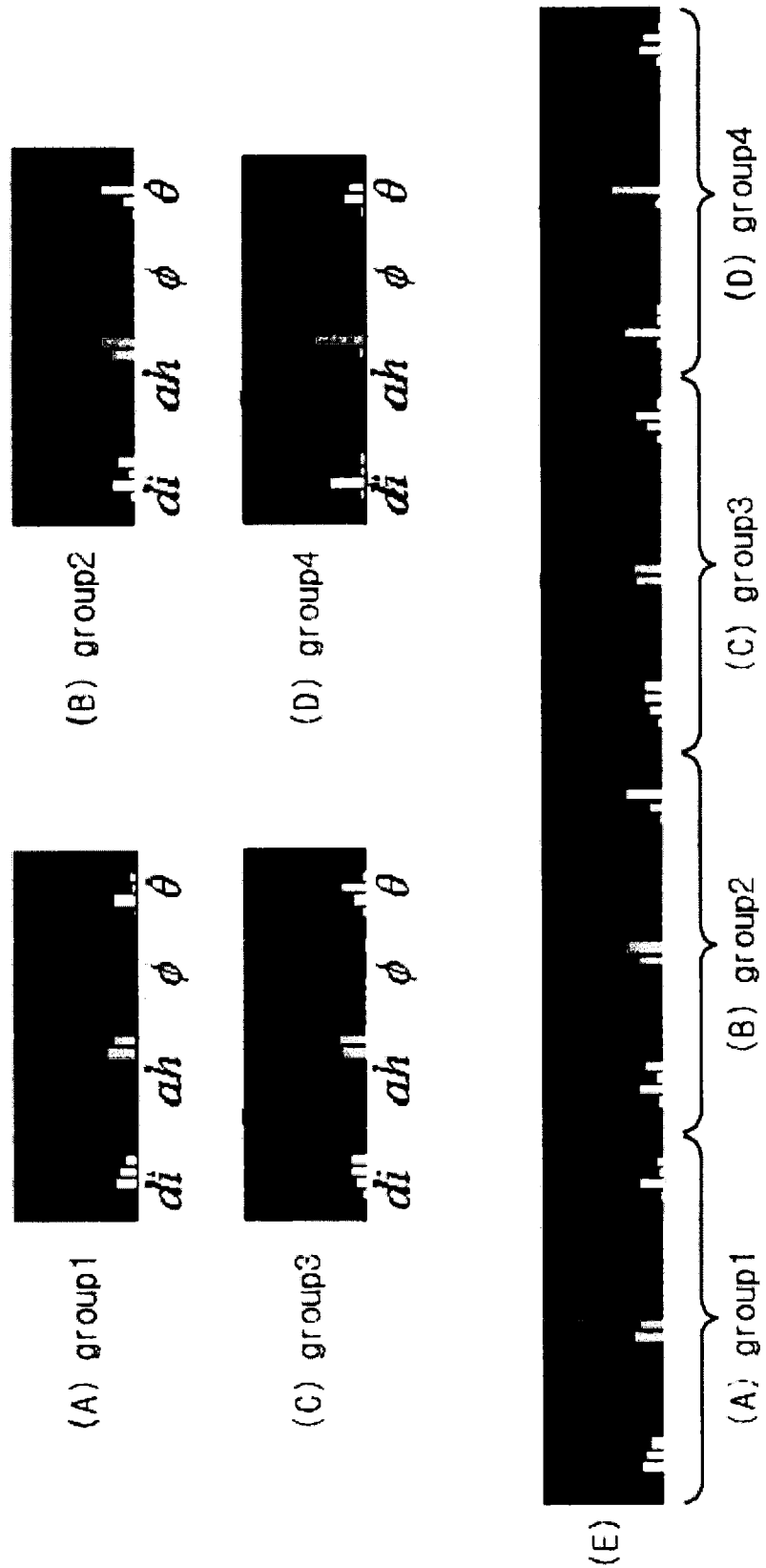
FIG. 11 illustrates an example of a histogram of a descriptor in accordance with an example embodiment of the present disclosure.

FIG. 11 is a drawing showing an example of a histogram of a descriptor in accordance with an example embodiment of the present disclosure. As shown on FIG. 11, in the embodiment of the present disclosure, the points are divided into the total of the 4 groups based on the distance between the reference point 'i' and the neighborhood point 'j'(refer to FIG. 10), and the descriptor having the total of 32 sections is generated for each of the 4 groups, one descriptor in accordance with the embodiment of the present disclosure is set to be provided with the total of the 128 sections. That is, an object composed of a point cloud is provided with descriptors in a number corresponding to the number of points that compose the point cloud.

Figure 12:
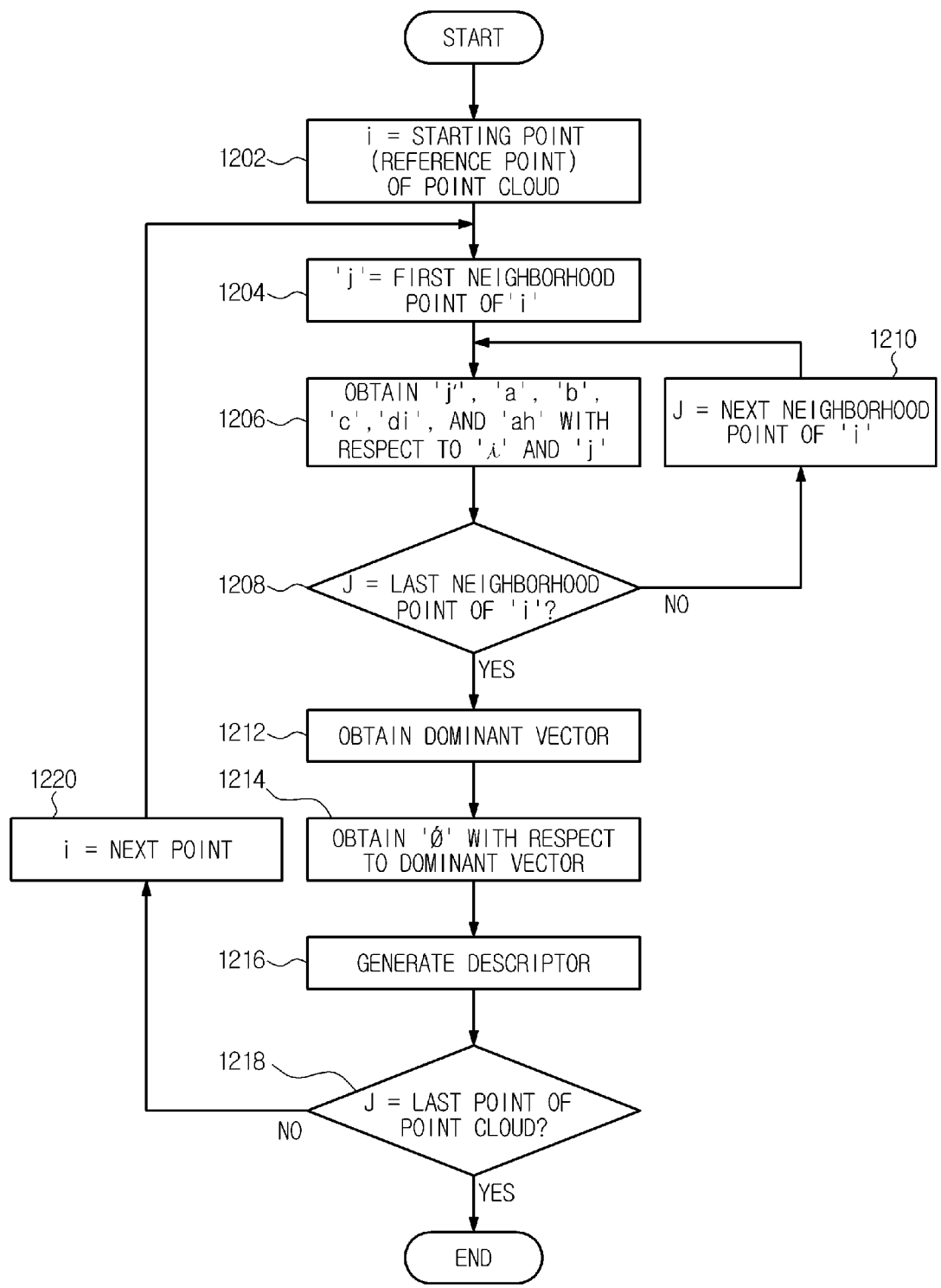
FIG. 12 is a flowchart showing a descriptor generating method in accordance with an example embodiment of the present disclosure.

FIG. 12 is a flowchart showing a descriptor generating method in accordance with an example embodiment of the present disclosure. As shown in FIG. 12, a certain point 'i' in a point cloud of an image of an object is set as a starting point in operation 1202. Since the starting point becomes the reference point 'i' as mentioned in the above description, while having the starting point as the reference point a first neighborhood point 'i' of the reference point 'i' is selected in operation 1204. Then, the 'j', the 'a', the 'b', the 'c', the 'di', the 'ah', and the 'θ' are obtained with respect to the reference point 'i' and the first neighborhood point 'j' in operation 1206. The process as above is performed on all the neighborhood points that compose the point cloud. That is, if the current neighborhood point 'j' is not the last neighborhood point of the reference point 'i' ('NO' from operation 1208), the 'j', the 'a', the 'b', the 'c', the 'di', the 'ah', and the 'θ' are obtained with respect to other neighborhood point 'j' of the reference point 'i' are obtained in operation 1210. If the current neighborhood point 'j' is the last neighborhood point of the reference point 'i' ('YES' from operation 1208), the dominant vector, that is, the 'mi' of FIG. 7, of the point cloud is obtained in operation 1212. If the dominant vector 'mi' is obtained, the angle 'Ø' with respect to the dominant vector 'mi' is obtained in operation 1214. By using the feature components including the 'di', the 'ah', the 'θ', and the 'Ø' that are obtained so far, the descriptor as shown in FIG. 11 is generated in operation 1216. The process of generating the descriptor as such is performed on each point of the point cloud. That is, if the current reference point 'i' is not the last point of the point cloud ('NO' from operation 1218), the control returns to operation 1204 to perform a descriptor generation on the next reference point. Further, if the current reference point 'i' is the last point of the point cloud ('YES' from operation 1218), it is determined that the generating of the descriptor with respect to all the points of the point cloud is completed, and the generating of the descriptor ends.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, any system or apparatus of the present disclosure may include at least one processor to execute at least one of the above-described units and methods.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A method of recognizing an object, the method comprising:
    extracting a feature component of a point cloud of a three-dimensional (3D) image of the object by using position information and color information of points that form the point cloud;
    generating a descriptor configured to recognize the object using the extracted feature component; and
    recognizing the object based on the generated descriptor,
    wherein the descriptor comprises:
        a first feature component, being a difference of brightness values between a reference point and a neighborhood point of the point cloud;
        a second feature component, being a hue value of the neighborhood point;
        a third feature component, being an angle between a vector from the reference point to the neighborhood point and a vector from the reference point to a projection point of the neighborhood point; and
        a fourth feature component, being an angle between a dominant vector of the point cloud and the vector from the reference point to the projection point of the neighborhood point.

2. The method of claim 1, wherein:
the first feature component is expressed as a following mathematical formula:

$$di_i^j = v_i - v_j$$

wherein, $v_i$ and $v_j$ are a brightness value of the reference point and a brightness value of the neighborhood point, respectively.

3. The method of claim 1, wherein:
the second feature component is expressed as a following mathematical formula:

$$ah_i^j = h_j$$

wherein, $h_j$ is the hue value of the neighborhood point.

4. The method of claim 1, wherein:
the third feature component is expressed as a following mathematical formula:

$$\theta_i^j = \arctan\left(\frac{a_i^j}{c_i^j}\right)$$

wherein, $a_i^j$ is equal to $$\frac{v_i \cdot b_i}{\|v_i\|^2} \times v_i,$$

$c_i^j$ is equal to $b_i^j - a_i^j$, $b_i^j$ is equal to $p_j - p_i$, such that $p_i$ and $p_j$ represent a position coordinate of the reference point and a position coordinate of the neighborhood point, respectively.

5. The method of claim 1, wherein:
the fourth feature component is expressed as a following mathematical formula:

$$\phi_i^j = \arccos\left(\frac{m_i \cdot c_i^j}{\|m_i\|\|c_i^j\|}\right)$$

wherein, $m_i$ is equal to $$\sum_{j=1}^{k} m_i^j,$$

and $m_i^j$ is equal to $$\frac{c_i^j}{\|c_i^j\|}\left(di_i^j \times \frac{1}{\sqrt{e^{\|c_i^j\|}}}\right).$$

6. The method of claim 5, wherein:
a sign of the fourth feature component is determined according to a following condition:

$$\phi_i^j = \begin{cases} -\phi_i^j, & \text{if } v_i \cdot (m_i \times c_i^j) \geq 0 \\ \phi_i^j, & \text{otherwise} \end{cases}.$$

7. The method of claim 1, wherein:
the descriptor is generated using a process of stacking from the first to the fourth feature components at a histogram.

8. The method of claim 7, wherein:
each of the first to fourth feature components has a value corresponding to one of a plurality of sections divided between a maximum value and a minimum value that are available for each of the first to fourth feature components.

9. The method of claim 7, wherein:
the points of the point cloud are divided into a plurality of groups based on a distance from the reference point, and a descriptor having a predetermined number of sections for each of the plurality of groups is generated.

10. The method of claim 1, further comprising:
performing a sampling to select K-nearest neighbor points with respect to a single reference point of the point cloud of the three dimensional image of the object, wherein K is a random integer.

11. The method of claim 1, wherein the extracting comprises extracting the feature component with respect to a reference point and a point in the point cloud that is a neighbor of the reference point using the position information and the color information, the position information and the color information including a position relationship and a color information relationship, respectively, between points of the point cloud.

12. The method of claim 1, wherein the generating the descriptor comprises stacking histograms of each feature component in a sequence.

13. A method of generating a descriptor for an object recognition, the method comprising:
obtaining a first feature component, being a difference of brightness values between a reference point and a neighbor point; a second feature component, being a hue value of the neighbor point; and a third feature component, being an angle between a vector from the reference point to the neighbor point and a vector from the reference point to a projection point of the neighbor point, with respect to a point cloud of a three dimensional image of an object;
obtaining a fourth feature component, being an angle between a dominant vector of the point cloud and vector from the reference point to the projection point of the neighbor point; and
generating a descriptor configured for the object recognition using the first to the fourth feature components.

14. The method of claim 13, wherein:
the first feature component is expressed as a following mathematical formula:

$$di_i^j = v_i - v_j$$

wherein, $v_i$ and $v_j$ are a brightness value of the reference point and a brightness value of the neighbor point, respectively.

15. The method of claim 13, wherein:
the second feature component is expressed as a following mathematical formula:

$$ah_i^j = h_j$$

wherein, $h_j$ is the hue value of the neighbor point.

16. The method of claim 13, wherein:
the third feature component is expressed as a following mathematical formula:

$$\theta_i^j = \arctan\left(\frac{a_i^j}{c_i^j}\right)$$

wherein, $a_i^j$ is equal to $$\frac{v_i \cdot b_i}{\|v_i\|^2} \times v_i,$$

$c_i^j$ is equal to $b_i^j - a_i^j$, $b_i^j$ is equal to $p_j - p_i$, such that $p_i$ and $p_j$ represent a position coordinate of the reference point and a position coordinate of the neighborhood point, respectively.

17. The method of claim 13, wherein:
the fourth feature component is expressed as a following mathematical formula:

$$\phi_i^j = \arccos\left(\frac{m_i \cdot c_i^j}{\|m_i\|\|c_i^j\|}\right)$$

wherein, $m_i$ is equal to $$\sum_{j=1}^{k} m_i^j,$$

and $m_i^j$ is equal to $$\frac{c_i^j}{\|c_i^j\|}\left(di_i^j \times \frac{1}{\sqrt{e^{\|c_i^j\|}}}\right).$$

18. The method of claim 17, wherein:
a sign of the fourth feature component is determined according to a following condition:

$$\phi_i^j = \begin{cases} -\phi_i^j, & \text{if } v_i \cdot (m_i \times c_i^j) \geq 0 \\ \phi_i^j, & \text{otherwise} \end{cases}.$$

19. The method of claim 13, wherein the first to fourth feature components are extracted from a K-nearest neighbor point group with respect to the reference point, wherein K is a random integer.

20. The method of claim 13, wherein the descriptor is generated using a process of stacking from the first to the fourth feature components at a histogram.

21. The method of claim 20, wherein each of the first to fourth feature components has a value corresponding to one of a plurality of sections divided between a maximum value and a minimum value that are available for the each of the first to fourth feature components.

22. The method of claim 20, wherein the points of the point cloud are divided into a plurality of groups based on a distance from the reference point, and a descriptor having a predetermined number of sections for each of the plurality of groups is generated.

23. The method of claim 13, further comprising:
performing a sampling to select K-nearest neighbor points with respect to a single reference point of the point cloud of the three dimensional image of the object, wherein K is a random integer.

24. An apparatus for generating a descriptor for an object recognition, the apparatus comprising:
a processor;
a non-transitory, computer-readable storage device encoded with computer-executable instructions which, when executed by the processor, carry out the following:
extracting a feature component of a point cloud of a three-dimensional (3D) image of the object by using position information and color information of points that form the point cloud;
generating a descriptor configured to recognize the object using the extracted feature component; and
recognizing the object based on the generated descriptor,
wherein the descriptor comprises:
a first feature component, being a difference of brightness values between a reference point and a neighbor point of a point cloud of a three dimensional (3D) image of an object;
a second feature component, being a hue value of the neighbor point;
a third feature component, being an angle between a vector from the reference point to the neighbor point and a vector from the reference point to a projection point of the neighbor point; and
a fourth feature component, being an angle between a dominant vector of the point cloud and the vector from the reference point to the projection point of the neighbor point.

25. The apparatus of claim 24, wherein:
the first feature component is expressed as a following mathematical formula:

$$di_i^j = v_i - v_j$$

wherein, $v_i$ and $v_j$ are a brightness value of the reference point and a brightness value of the neighbor point, respectively.

26. The apparatus of claim 24, wherein:
the second feature component is expressed as a following mathematical formula:

$$ah_i^j = h_j$$

wherein, $h_j$ is the hue value of the neighbor point.

27. The apparatus of claim 24, wherein:
the third feature component is expressed as a following mathematical formula:

$$\theta_i^j = \arctan\left(\frac{a_i^j}{c_i^j}\right)$$

wherein, $a_i^j$ is equal to $$\frac{v_i \cdot b_i}{\|v_i\|^2} \times v_i,$$

$c_i^j$ is equal to $b_i^j - a_i^j$, $b_i^j$ is equal to $p_j - p_i$, such that $p_i$ and $p_j$ represent a position coordinate of the reference point and a position coordinate of the neighborhood point, respectively.

28. The apparatus of claim 24, wherein:
the fourth feature component is expressed as a following mathematical formula:

$$\phi_i^j = \arccos\left(\frac{m_i \cdot c_i^j}{\|m_i\|\|c_i^j\|}\right)$$

wherein, $m_i$ is equal to $$\sum_{j=1}^{k} m_i^j,$$

and $m_i^j$ is equal to $$\frac{c_i^j}{\|c_i^j\|}\left(di_i^j \times \frac{1}{\sqrt{e^{\|c_i^j\|}}}\right).$$

29. The apparatus of claim 28, wherein:
a sign of the fourth feature component is determined according to a following condition:

$$\phi_i^j = \begin{cases} -\phi_i^j, & \text{if } v_i \cdot (m_i \times c_i^j) \geq 0 \\ \phi_i^j, & \text{otherwise} \end{cases}.$$

* * * * *